Oct. 3, 1944.   J. C. SHAW   2,359,448
FLUID TEMPERATURE CONTROLLING DEVICE
Filed June 29, 1942   3 Sheets-Sheet 1

INVENTOR.
JOE C. SHAW
BY
ATTORNEY

Oct. 3, 1944. J. C. SHAW 2,359,448
FLUID TEMPERATURE CONTROLLING DEVICE
Filed June 29, 1942 3 Sheets-Sheet 2

INVENTOR.
JOE C. SHAW
BY A.S.Krob
ATTORNEY

Patented Oct. 3, 1944

2,359,448

UNITED STATES PATENT OFFICE 2,359,448

FLUID TEMPERATURE CONTROLLING DEVICE

Joe C. Shaw, Racine, Wis., assignor to Young Radiator Company, Racine, Wis., a company of Wisconsin Application June 29, 1942, Serial No. 449,026

4 Claims. (Cl. 257—2)

The present invention relates to means for controlling the temperature particularly of lubricating oil of an internal combustion engine and particularly airplane engines where the cooling medium is preferably a current of air forced through closely spaced tubes for heat exchange contact with the oil.

Airplanes must operate in all temperatures, altitudes and weather conditions. At times, it may be desired to make an immediate take-off at temperatures as low as 50° below zero. For this reason, I provide means whereby the temperature of the chilled oil is permitted to rise quickly after the engine is started, by first causing it to pass through a short by-pass until it is somewhat warmed and then cause it to pass through a prewarming chamber which is in heat exchange contact with the cooling core until it rises to an operating temperature, after which it is caused to pass through the cooling core.

Objects of my invention, generally stated, are to permit a rapid heating of the oil after the engine is started and to more perfectly control the temperature of the oil within predetermined limits regardless of atmospheric conditions.

A further object of my invention is to provide means whereby the cooling device and connections thereto are protected against injury from excessive pressure and against accidental injury of the operating parts.

Under some weather conditions, an airplane may take off at normal temperatures and within 30 minutes, it may reach the stratosphere where the temperature of the air is perhaps 50° or more below zero.

An object of my invention is to provide means for preventing the oil from being over cooled while passing through the core and reaching the outlet in an over cooled state regardless of atmospheric conditions.

The common practice, particularly during low temperatures, is to start the engine and delay taking off for a few minutes until the temperature of the oil reaches 100° or more, anticipating that it will reach the predetermined normal operating temperature of between 140 to 180° quickly after the take-off.

Before starting the engine, the ground temperature may possibly be as low as 40 to 50° below zero; therefore in order to permit the oil to heat quickly, it must not be subjected to the cooling effect of the air passing through or around the device. I therefore provide a by-pass between the inlet and outlet of the device having a pressure responsive valve which will allow the oil to pass therethrough when it enters the inlet of the device in a chilled condition and at a dangerous pressure.

After the pressure has been reduced, because of the oil being somewhat warmed, the oil will then be caused to pass through the prewarming chamber and after the oil leaving the prewarming chamber has reached a normal operating temperature, the valves will act to force the oil through the cooling core.

It will be seen that, as stated, the object of the present invention is to completely control the temperature of the oil after it has once reached a safe operating temperature.

I accomplish the above enumerated objects by providing two pairs of valves, each having controlling means and by positioning a pair of valves and its controlling means in the inlet and a pair of valves and its controlling means in the outlet of the device so the oil, after leaving the engine, first contacts the inlet valves and their controlling means and the oil before leaving the device is caused to contact the outlet valves and their controlling means and by providing suitable ports and passageways between the valves, cooling core and prewarming chamber.

To these and other useful ends, my invention consists of parts, combinations of parts, or their equivalents, and mode of operation, as hereinafter set forth and claimed and shown in the accompanying drawings in which:

Figure 1:
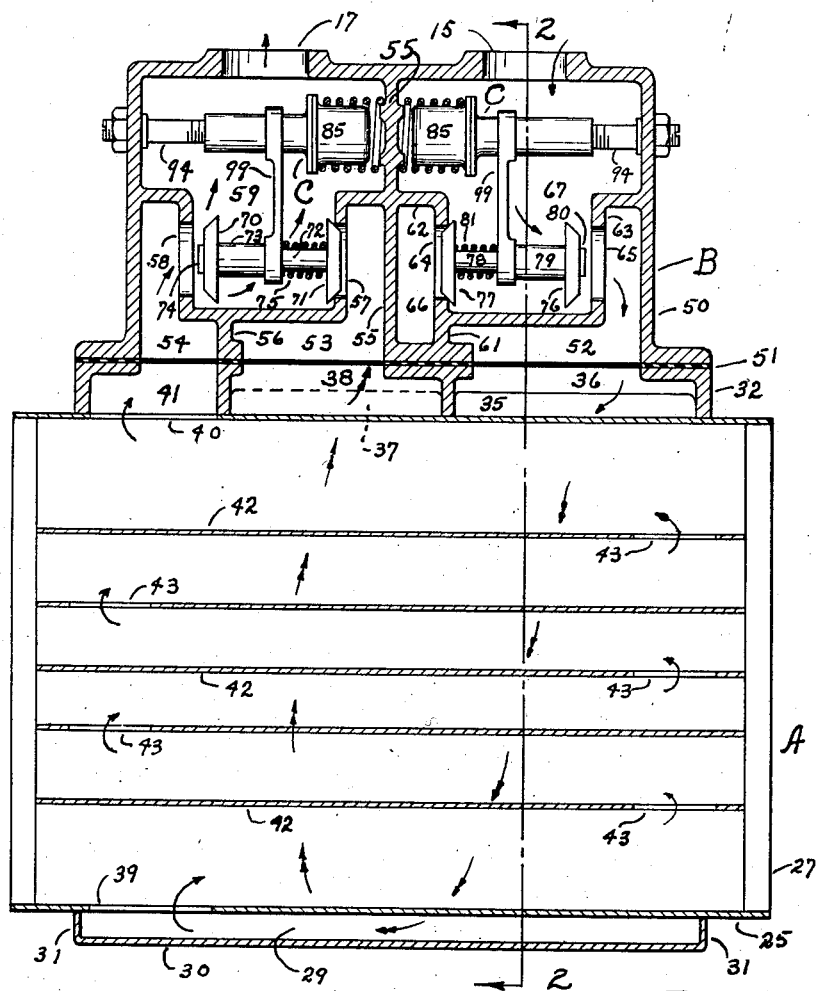
Fig. 1 is a longitudinal vertical section through a conventional heat exchanger or cooling core and prewarming chamber and through one form of my improved controlling device, taken on line 1—1 of Figure 2.
Figure 3:
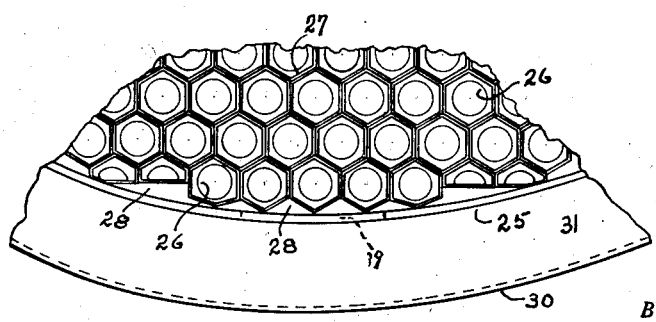
Fig. 3 is an enlarged fractional end view of the bottom of the heat exchange device as shown in Figure 1.

As thus illustrated, the heat exchange core and prewarming chamber are, in their entirety, designated by reference character A. The valves and valve housing in their entireties are designated by reference character B. The thermal valve controlling devices in their entireties are designated by reference character C.

Figure 5:
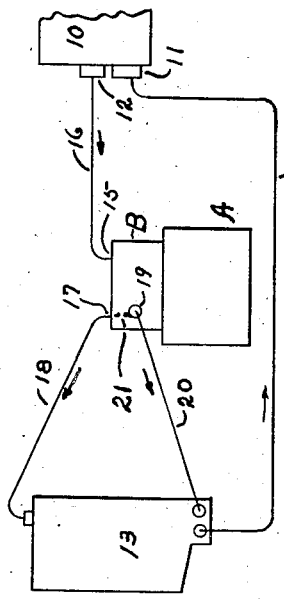
Fig. 5 is a diagrammatic drawing illustrating a fraction of the engine, the device shown in Figures 1 and 2, and an oil tank and connections between these members.

The preferred form of my device and its connection to the engine is shown in Figure 5 wherein the operating parts are shown diagrammatically. Numeral 10 designates a fraction of an engine, 11 designates the oil pressure pump and 12 the scavenger pump. Numeral 13 designates an oil supply tank. Pump 11 is provided with a connection 14 for supplying the pump with oil, the pump being connected to the various bearings in the usual manner.

Sump pump 12 is connected to the inlet 15 of member B by means of pipe 16 and the outlet 17 of member B is connected to oil supply tank 13 by means of pipe 18. The special relief valve outlet 19 is connected to the oil supply tank 13 by pipe 20.

In Figure 5, the direction of flow of oil through the connections is indicated by single pointed arrows. Member A comprises a cylinder 25 having a bundle of closely spaced tubes 26, their ends being expanded into hexagonal shapes 27 and contacting each other so they may be bonded together, the outer row of full and half hexes being bonded to member 25.

Where the outside hexes do not fit closely against the inside surface of member 25 as at 28, suitable fillers are provided with which a leak proof joint may be made; thus the ends of the tubes will form an inclosure so a cooling medium may be forced through the tubes and the oil cooled by being forced between the tubes in the inclosure as will hereinafter appear, forming what is generally called a heat exchanger or cooling core.

I provide a prewarming chamber 29 formed by a circular band 30 having end flanges 31—31 which are suitably bonded, brazed or welded to member 25. A valve chamber supporting bracket 32 is provided being contacted on opposite sides by the ends of members 30 and 31 and being bonded or brazed thereto (see Figure 2).

Member 32 is provided with a port 35 forming a passageway from a chamber 36 into the inlet end of member 29. A port 37 forms a passageway from the outlet end of member 29 into a chamber 38 in member 32 (see dotted lines in Figures 1 and 2); thus oil may pass from chamber 36 through chamber 29 and into chamber 38 as indicated by double pointed arrows in Figures 1 and 2.

I provide a port 39 in the bottom of cylinder 25 whereby oil may, when it reaches the bottom of member 29, pass into the tube chamber and from this chamber through port 40 into a chamber 41 in member 32. It is desired to increase the length of travel of the oil many times between ports 39 and 40; I therefore provide suitably spaced baffle plates 42 which are positioned between certain transverse rows of tubes and their hexed end members each having a port 43 at one end as illustrated in Figure 1; thus the oil will pass through the tube chamber sinuously as clearly indicated in Figure 1 by single pointed arrows.

During sub-zero weather, the oil in the tube chamber will be chilled so it will not pass at all between the tubes. When this occurs, I provide means whereby it will be permitted to pass through the annular chamber 29 only and when the oil has been sufficiently warmed in the tube chamber, I provide means whereby it will all be permitted to pass directly through the tube chamber from port 39 to chamber 41 as already described. It will be understood that there may be times, depending upon the temperature of the oil in the tube chamber, when more or less will be passed therethrough and the remainder through the annular chamber; however normally, after the oil in the tube chamber has reached a predetermined temperature, it will all be forced through the tube chamber and in heat exchange contact with the air passing through the tubes as will hereinafter appear.

Member B comprises a housing 50 which is held to member 32 by means of a suitable number of bolts (not shown) with a gasket 51 therebetween. Member B is provided with chambers 52, 53 and 54, the bottoms of which register with chambers 36, 38 and 41 respectively.

I provide a medial partition 55 and a partition 56 which is shaped as indicated, having valve openings 57 and 58 and forming a chamber 59 with an outlet 17. I also provide a partition 61 which joins partition 55 as illustrated in Figure 1, having extensions 62 and 63 with valve seat openings 64 and 65 respectively; thus completing chamber 52 and forming a chamber 66 with outlet 19 and an inlet chamber 67 with inlet 15.

I provide means whereby the oil in chamber 67 may pass either into chambers 52 or 66 and whereby oil in chambers 53 or 54 may pass into outlet chamber 59 and escape through outlet 17 in the following manner:

A valve 70 is provided with a valve 71 having a stem 72 which slidably extends through a sleeve 73 of valve 70, the stem having a head 74 and a spring 75 so valves 70 and 71 are held a fixed maximum distance apart but valve 71 may, by overcoming the pressure of spring 75, move toward valve 70 either to relieve the pressure caused by over expansion of the thermal unit or this spring may act to permit escape of oil from chamber 53 into chamber 59 independent of member C.

Figure 6:
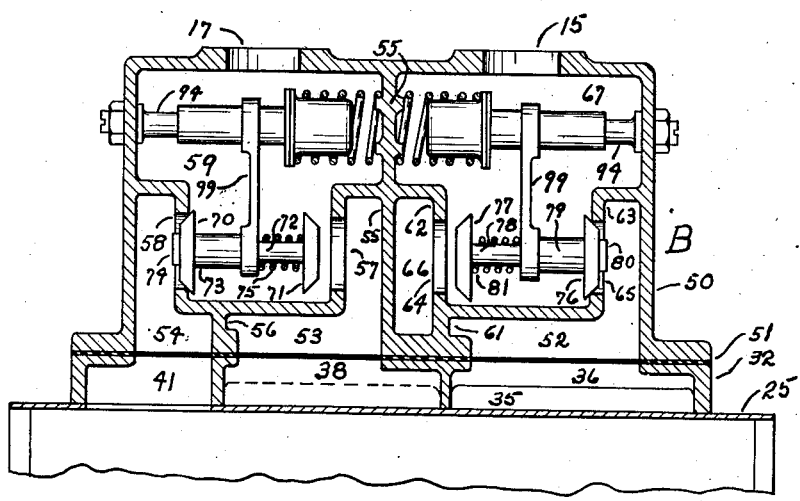
Fig. 6 is a view of the valve mechanism similar to that shown in Figure 1 except with the valves moved to the opposite positions from that shown in Figure 1.

In the reverse order, I provide a valve 76 having mounted thereon another valve 77 with a stem 78 which slidably extends through a sleeve 79 on valve 76, the stem having a head 80 so valves 76 and 77 are held a fixed maximum distance apart. Valve 77 may approach valve 76 by overcoming the pressure of a spring 81. It will be seen that the valves are arranged in pairs and spaced so normally one or the other of their ports may be opened or closed as illustrated in Figures 1 and 6.

I provide preferably thermal means C for controlling the pairs of valves as follows:

Members C comprise a cup 85 having preferably a flange 86 and a cylinder 87 having a flange 88. Members 86 and 88 are secured together by means of a suitable number of bolts 89 with an intervening washer 90 which is preferably made from synthetic rubber. Cup 85 is filled with a suitable material, preferably a jelly 91 which is thermally sensitive having definite and favorable expansion and contraction characteristics.

The inner end of member 87 is filled with preferably a synthetic rubber stopper 92, the remainder of the chamber in member 87 is occupied by a plunger 93 which protrudes from member 87 a considerable distance and being threaded as illustrated. A bolt 94 is screw threaded into member 93 as illustrated and is anchored to the end walls of member B by means of a flange 95 and a nut 96 which is screw threaded on the outer end of member 94. The outer end of member 94 is slotted as at 97; thus by loosening nut 96, member 94 may be turned for adjusting the distance between member 93 and the end wall of the chamber.

I provide a pressure spring 98 which is shaped and positioned as shown and adapted to yieldingly force member 93 into cylinder 87, thus when the temperature of the material 91 changes, the position of member 93 relative to member 87 will be changed. For example, if material 91 is expanded, then the gasket 90 will be forced into the chamber in member 87 and material 92 will be forced outwardly against plunger 93, resulting in member 85 moving toward member 55 and as material 91 is cooled or contracted, the movement of member 87 will be in the opposite direction.

Figure 7:
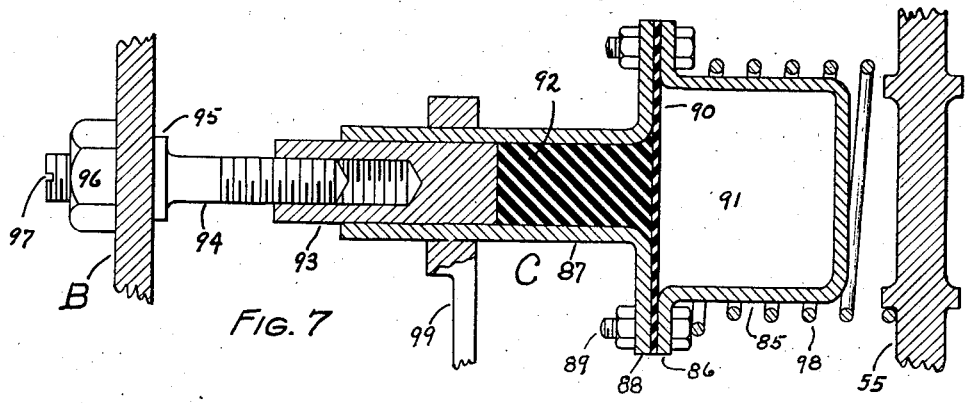
Fig. 7 is a detail longitudinal sectional view of the preferred form of a thermal device as shown in Figures 1 and 6.

I provide arms 89 which are rigidly secured to cylinders 87 and to sleeves 73 and 79. It will be seen by scrutinizing Figures 1 and 7 that the valves will be controlled by the expansion and contraction of material 91. In Figure 1, this material is shown as having been expanded so as to move valves 70 and 76 to their open position and valves 71 and 77 to their closed position.

In Figure 6, the valves are shown in the opposite position from that shown in Figure 1. That is, material 91 has been cooled somewhat. Clearly by adjusting bolts 94, the valves may be caused to open and close at predetermined temperatures. For example, when oil entering inlet 15 has a temperature of say 180°, adjustments may be made to hold the valves in the position shown in Figure 1 and when the oil passing from chamber 59 to outlet 17 is at a temperature of around 140°, adjustments may be made to hold the valves as illustrated; however if the airplane has passed into the stratosphere or is exposed to a very low temperature so the oil, after leaving the cooling core is below 140°, the device is adapted to move valves 70 and 71 to the position shown in Figure 6 so the oil will be again permitted to pass through the preheating chamber only and the temperature of the oil permitted to rise again because it will not then be exposed to the full cooling effect of the core.

If the oil entering inlet 15 is chilled, then valves 76 and 77 will be moved to the position shown in Figure 6 so the oil will pass directly into chamber 66 and to outlet 19.

Figure 2:
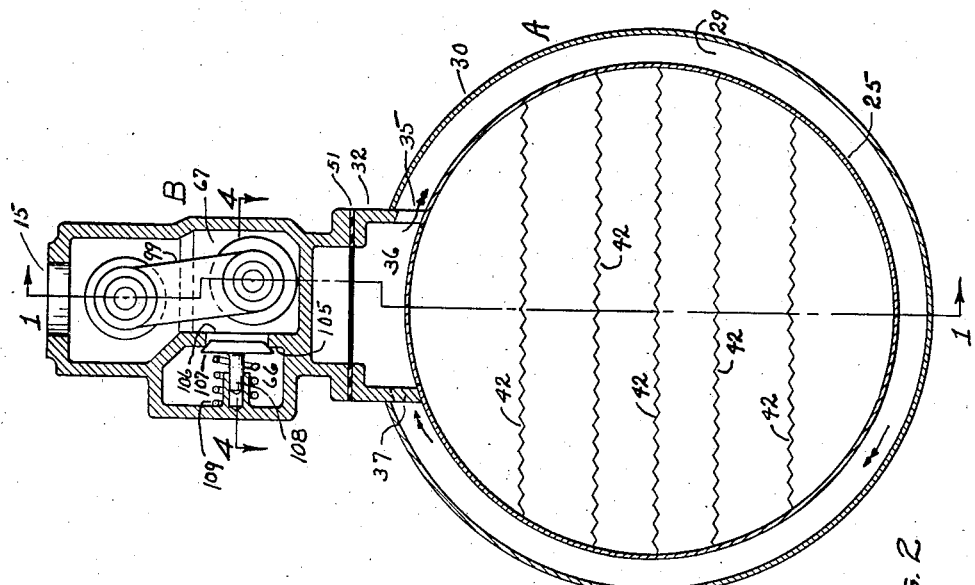
Fig. 2 is a transverse section of the device shown in Figure 1, taken on line 2—2 of this figure.

In Figure 2 I have shown chamber 66 as being separated from chamber 67 by a partition 105 having an opening 106 and a valve 107, the valve having a stem 108 slidably mounted in an opening in the housing as illustrated, and having a spring 109. When this valve is open, a direct connection is formed between chambers 66 and 67 (see Figure 4) the spring pressure being such as will permit the valve to lift after a predetermined pressure in chamber 67 has been reached so the oil is by-passed through outlet 19 into pipe 20. However I may elect to form a connection between chamber 66 and chamber 59 by means of a port indicated by dotted lines in Figure 5 and identified by numeral 21; thus the by-passed oil will enter tank 13 through pipe 18 instead of through pipe 20.

It will be seen that I have provided means for protecting the device against excessive pressure which might occur if either of the thermal devices or valves were out of order.

Figure 4:
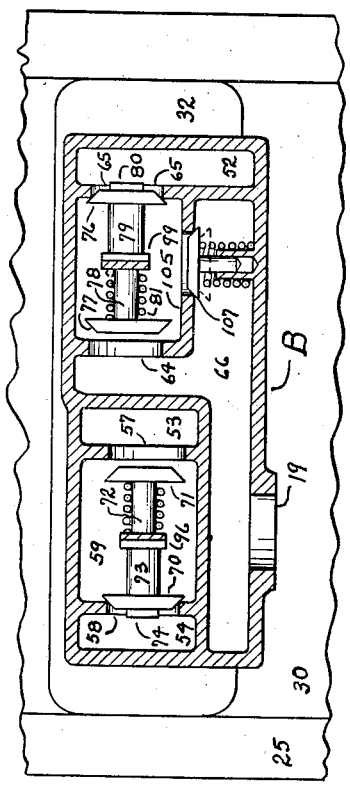
Fig. 4 is a horizontal section through the valve mechanism taken on line 4—4 of Figure 2.

By scrutinizing Figures 1, 4 and 6, it will be seen that if the oil is chilled when it enters inlet 15, it will be permitted to pass directly to outlet 19 and if the oil enters at a practical working temperature, it will be permitted to enter chamber 29 but the valves in chamber 59 will determine whether the oil is to complete its course through chamber 29 or pass into port 39 and through the tube chamber; thus there are two means of controlling the oil temperature and a third means for protecting the device against injury in case the other means are out of order.

It will be seen by referring to Figure 1 that the pressure in chamber 53 might overcome spring 75 and permit the oil to escape into chamber 59 irrespective of the position of member C and that springs 75 and 81 will act to protect the thermal controlling means and valves against excessive pressure caused by over expansion of material 91.

It will be understood that I have shown my preferred form of valves and their controlling means, and that I do not wish to be limited to the particular design shown.

Having thus shown and described my invention, I claim:

1. A liquid temperature controlling device of the class described, comprising a chamber having a bundle of closely spaced tubes extending therethrough for the passage through the tubes of a cooling fluid forming a cooling core, a prewarming chamber in heat exchange contact with said core, a common inlet and a common outlet for said core and prewarming chamber, two pairs of normally spaced valves having seats and being arranged whereby when one valve of a pair is closed, the other valve will be opened, each of said pair of valves having individual thermal means for shifting the valves from one seat to the other, one of said pairs of valves and their thermal means being positioned in said common inlet and the other valves and their thermal means being positioned in said common outlet, liquid passageways associated with the inlets and outlets of said core, precooling chamber and valves and means whereby when the liquid entering the inlet is below a predetermined temperature, said first valves will be operated to cause the liquid to pass directly from the inlet to the outlet and whereby when the liquid entering the inlet is somewhat warmed, the valves will be operated to cause the liquid to pass through said precooling chamber and whereby when the liquid entering said outlet is at a predetermined operating temperature, the valves therein will be moved to thereby force the liquid to pass through said core.

2. A device as recited in claim 1 including; a pressure responsive release valve forming a connection between said common inlet and outlet whereby an abnormal pressure in the inlet will cause the valve to lift and the liquid to flow directly into the outlet irrespective of the position of said pairs of valves.

3. An oil temperature controlling device of the class described, comprising a heat exchange cooling core having a prewarming chamber in heat exchange contact therewith, a common inlet and a common outlet for said core and prewarming chamber, thermally sensitive means with valves connected thereto positioned in said common inlet and in said common outlet, liquid passageways arranged between said first valves and the inlet of said prewarming chamber and the common outlet, liquid passageways arranged between said second valves and the outlets of said prewarming chamber and core, the thermally sensitive device and its valves in said common inlet being arranged whereby chilled oil entering the inlet will operate the valves to direct the oil into said outlet and whereby when the entering oil has been somewhat warmed the valves will be operated to direct the oil into the inlet of said prewarming chamber and whereby when the oil leaving said prewarming chamber has reached a predetermined temperature the thermally sensitive device in said outlet will operate its valves to cause the oil to pass through said core and whereby when the oil leaving the prewarming chamber is below a predetermined temperature, the last valves will be operated to cause the oil to pass directly from the prewarming chamber into said outlet.

4. A device as recited in claim 3 including; a pressure responsive relief valve forming a connection between said inlet and outlet whereby an abnormal pressure in the inlet will cause the valve to lift and the oil to flow directly into the outlet irrespective of the position of said valves.

JOE C. SHAW.